United States Patent
Lee et al.

(10) Patent No.: US 7,410,715 B1
(45) Date of Patent: Aug. 12, 2008

(54) FUEL CELL SYSTEM

(75) Inventors: Ching-Po Lee, Hsinchu (TW); Jin-Shu Huang, Hsinchu (TW); Nien-Hui Hsu, Hsinchu (TW); Cheng Wang, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 11/836,149

(22) Filed: Aug. 9, 2007

(30) Foreign Application Priority Data

Feb. 9, 2007 (TW) .............................. 96104767 A

(51) Int. Cl.
*H01M 8/04* (2006.01)

(52) U.S. Cl. ........................................ 429/26; 429/34
(58) Field of Classification Search ........................ None
See application file for complete search history.

(56) References Cited

U.S. PATENT DOCUMENTS

| | | | |
|---|---|---|---|
| 6,475,652 B2* | 11/2002 | Grasso et al. ................. | 429/13 |
| 2004/0241061 A1 | 12/2004 | Takai et al. | |
| 2006/0073364 A1* | 4/2006 | Ballantine et al. ............ | 429/13 |
| 2006/0083963 A1* | 4/2006 | Margiott et al. ............... | 429/13 |

* cited by examiner

*Primary Examiner*—John S Maples
(74) *Attorney, Agent, or Firm*—Jianq Chyun IP Office

(57) ABSTRACT

A fuel cell system includes a circulatory device and a fuel cell module. The fuel cell module includes a membrane electrode assembly (MEA), an anode flow field plate and a heat exchange module. The anode flow field plate is disposed at a side of the MEA and has an inlet and an outlet. The heat exchange module includes a fluid-conveying unit and a heat exchange unit. At least a part of the heat exchange unit is disposed inside the fluid-conveying unit to divide the heat exchange unit into a first channel and a second channel. The first channel communicates with the circulatory device and the inlet. The second channel communicates with the circulatory device and the outlet. The circulatory device injects a portion of the liquid reactant into the anode flow field plate through the first channel. The remainder reaction solution flows into the circulatory device through the second channel.

12 Claims, 7 Drawing Sheets

FUEL CELL SYSTEM

CROSS-REFERENCE TO RELATED APPLICATION

This application claims the priority benefit of Taiwan application serial no. 96104767, filed Feb. 9, 2007. All disclosure of the Taiwan application is incorporated herein by reference.

BACKGROUND OF THE INVENTION

1. Field of the Invention

The present invention generally relates to a cell system, and more particularly, to a fuel cell system.

2. Description of Related Art

Referring to FIG. 1, a conventional direct methanol fuel cell system 100 mainly includes a circulatory device 110, a direct methanol fuel cell module 120 and a methanol-supplying device 130. The direct methanol fuel cell module 120 includes a membrane electrode assembly (MEA) 122, an anode flow field plate 124a, a cathode flow field plate 124b, an anode current-collecting plate 126a and a cathode current-collecting plate 126b. The MEA 122 is located between the anode flow field plate 124a and the cathode flow field plate 124b, the anode flow field plate 124a is located between the anode current-collecting plate 126a and the MEA 122, and the cathode flow field plate 124b is located between the cathode current-collecting plate 126b and the MEA 122. The MEA 122 includes an anode carbon cloth 122a, an anode catalyst layer 122b, a proton exchange membrane (PEM) 122c, a cathode catalyst layer 122d and a cathode carbon cloth 122e, which are sequentially arranged from a side near the anode flow field plate 124a to a side near the cathode flow field plate 124b. The anode flow field plate 124a has an inlet I1 and an outlet O1. The circulatory device 110 is adapted for injecting methanol solution into the anode flow field plate 124a via the inlet I1, and the injected methanol solution permeates from the anode flow field plate 124a through the anode carbon cloth 122a and then be diffused in the anode catalyst layer 122b, where an anode half-reaction is produced as follows:

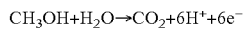

The remainder methanol solution after the reaction flows into the circulatory device 110 via the outlet O1.

Similarly, the cathode flow field plate 124b also has an inlet I2 and an outlet O2. The inlet I2 is adapted to make oxygen gas pass there-through and then be injected into the cathode flow field plate 124b. The injected oxygen gas permeates from the cathode flow field plate 124b through the anode carbon cloth 122e and then is diffused in the cathode catalyst layer 122d, where a cathode half-reaction is produced as follows:

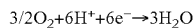

The electrons produced by the anode half-reaction are delivered to outside from the anode current-collecting plate 126a and return to the cathode current-collecting plate 126b, which forms a loop so as to provide the cathode half-reaction with required electrons. The hydrogen ions produced by the anode half-reaction are driven by an electrical permeability force to penetrate into the cathode catalyst layer 122d via the PEM 122c in a form of a hydrogen ion together with several water molecules, so as to provide the cathode half-reaction with required hydrogen ions. The overall reaction combining the anode half-reaction with the cathode half-reaction is expressed as follows:

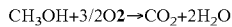

The water produced by the cathode half-reaction is introduced into the circulatory device 110 via the outlet O2. The remainder methanol solution in the anode half-reaction, the water produced by the cathode half-reaction and the methanol supplied by the methanol-supplying device 130 are mixed up into methanol solution in the circulatory device 110, and the methanol solution is injected into the anode flow field plate 124a via the inlet I1.

The output electrical power of the methanol fuel cell system 100 is related to the temperature of the methanol solution injected to the anode flow field plate 124a via the inlet I1. In general, the higher the temperature of the methanol solution, the higher the output electrical power is. The heat energy produced by the anode half-reaction is able to increase the temperature of the remainder methanol solution after the reaction. However, after the remainder methanol solution is mixed with the water produced by the cathode half-reaction and the methanol supplied by the methanol-supplying device 130 into the methanol solution required by the anode half-reaction and the methanol solution then is conveyed through the whole fluid-conveying path of the circulatory device 110, the temperature of the methanol solution required by the anode half-reaction is largely reduced. Therefore, due to a too low temperature of the methanol solution injected into the anode flow field plate 124a, the output electrical power of the conventional methanol fuel cell system 100 is quite low.

In order to increase the temperature of the methanol solution in the anode flow field plate 124a, some of the conventional methanol fuel cell systems employ an electric heating wire or an electric heater to heat the methanol solution to increase the temperature of the methanol solution, which consumes additional electrical energy and reduces the total output electrical power of the methanol fuel cell system.

SUMMARY OF THE INVENTION

Accordingly, the present invention is directed to a fuel cell system capable of outputting higher electrical power.

The other objectives and the advantages of the present invention can be understood from the disclosed technical features of the present invention.

An embodiment of the present invention provides a fuel cell system including a circulatory device and a fuel cell module. The fuel cell module includes a membrane electrode assembly (MEA), an anode flow field plate and a heat exchange module. The anode flow field plate is disposed at a side of the MEA and has an inlet and an outlet. The heat exchange module includes a fluid-conveying unit and a heat exchange unit, wherein at least a part of the heat exchange unit is disposed in the fluid-conveying unit so as to divide the fluid-conveying unit into a first channel and a second channel. The first channel communicates with the circulatory device and the inlet, and the second channel communicates with the circulatory device and the outlet. The circulatory device is adapted for injecting a liquid reactant into the anode flow field plate, and the remainder liquid reactant is discharged to the circulatory device via the second channel.

Since the fuel cell system of the present invention employs the heat exchange module, the remainder liquid reactant with a higher temperature output from the outlet exchanges the heat thereof to the liquid reactant with a lower temperature through the heat exchange unit. Thus, the temperature of the liquid reactant flowing through the heat exchange module is increased. Accordingly, the temperature of the liquid reactant in the anode flow field plate injected via the inlet from the heat exchange module is increased, which enhances the output of the electrical power of the fuel cell system of the present invention.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
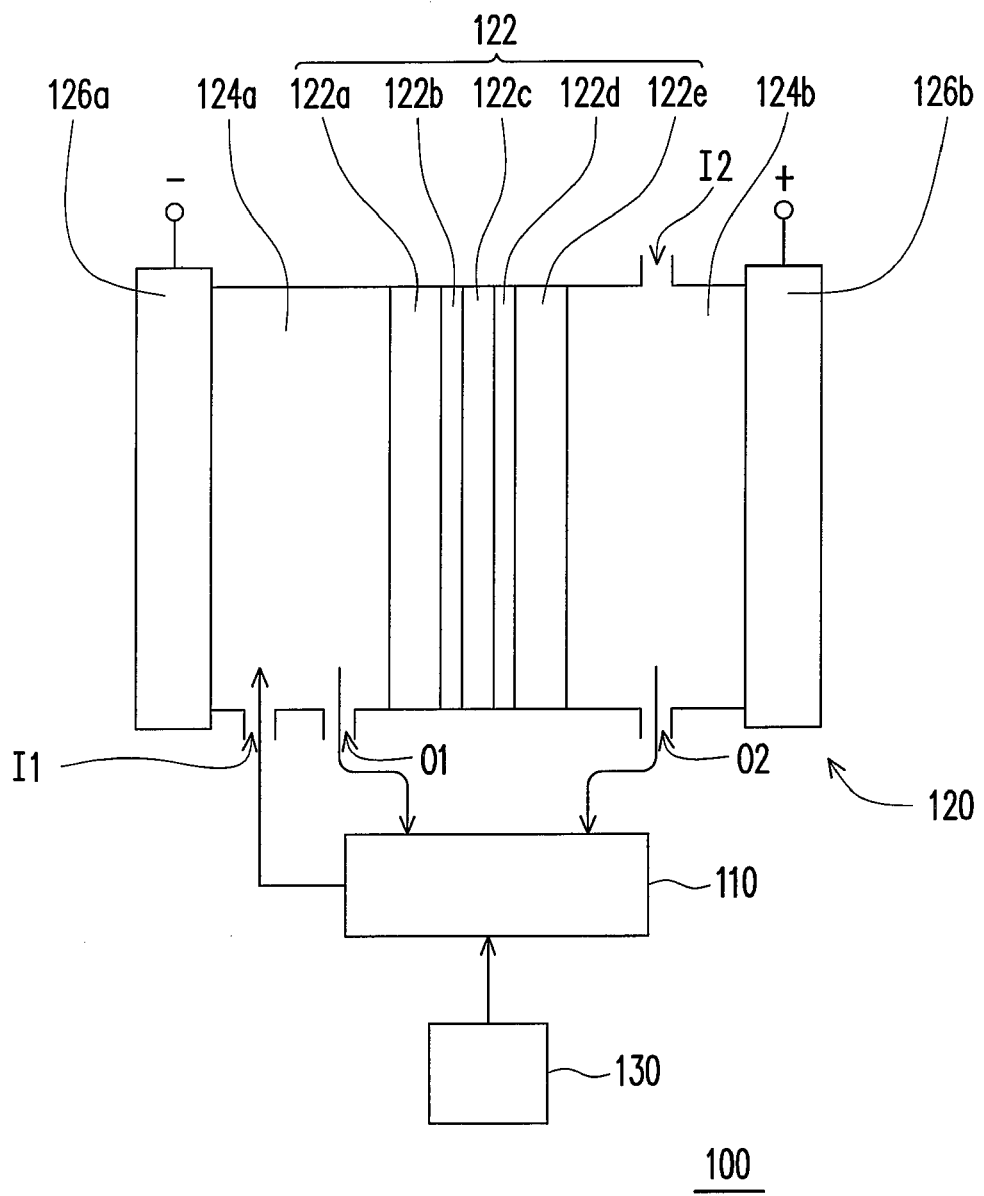
FIG. 1 is a schematic diagram of a conventional methanol fuel cell system.
Figure 2A:
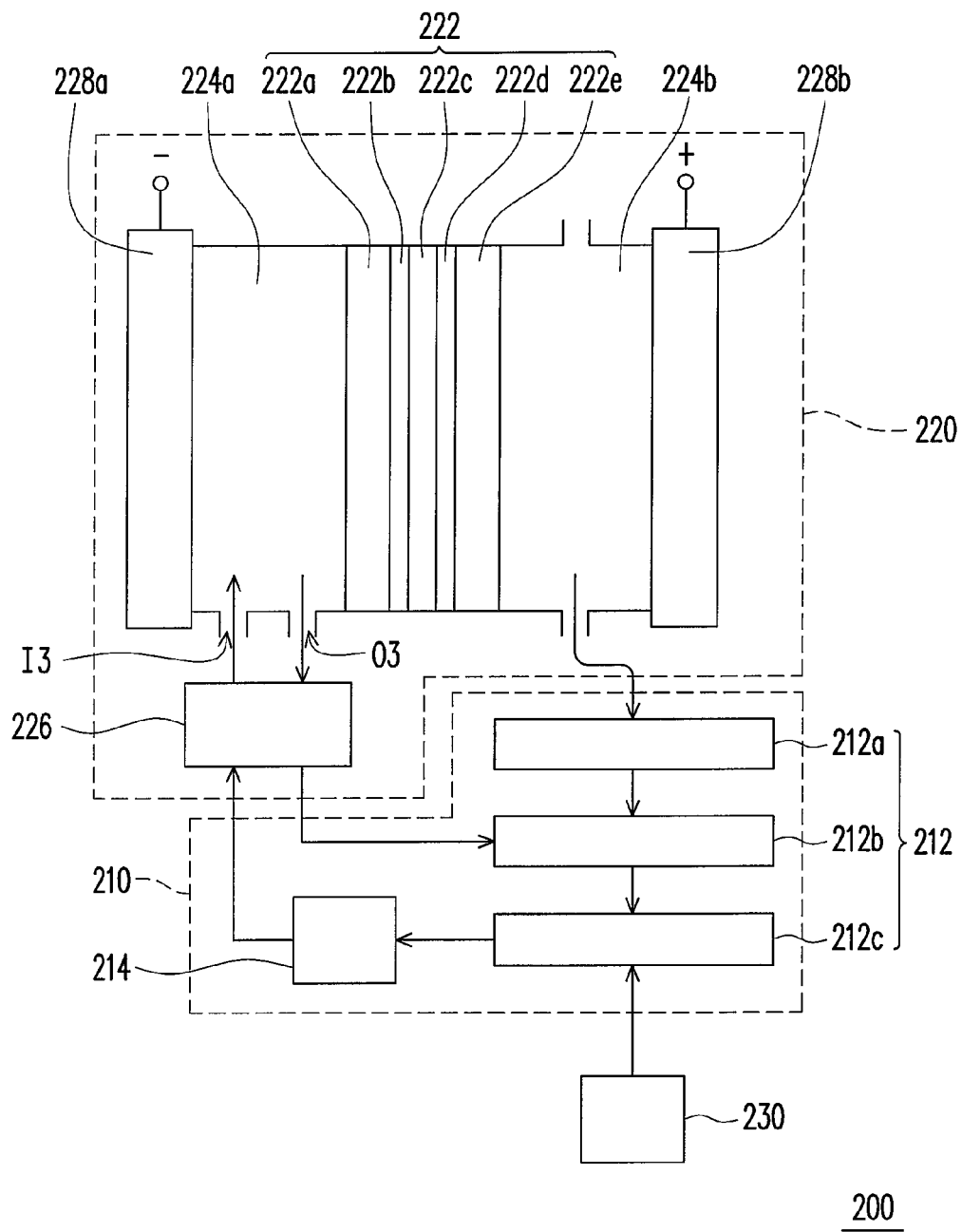
FIG. 2A is a schematic diagram of a fuel cell system according to an embodiment of the present invention.
Figure 2B:
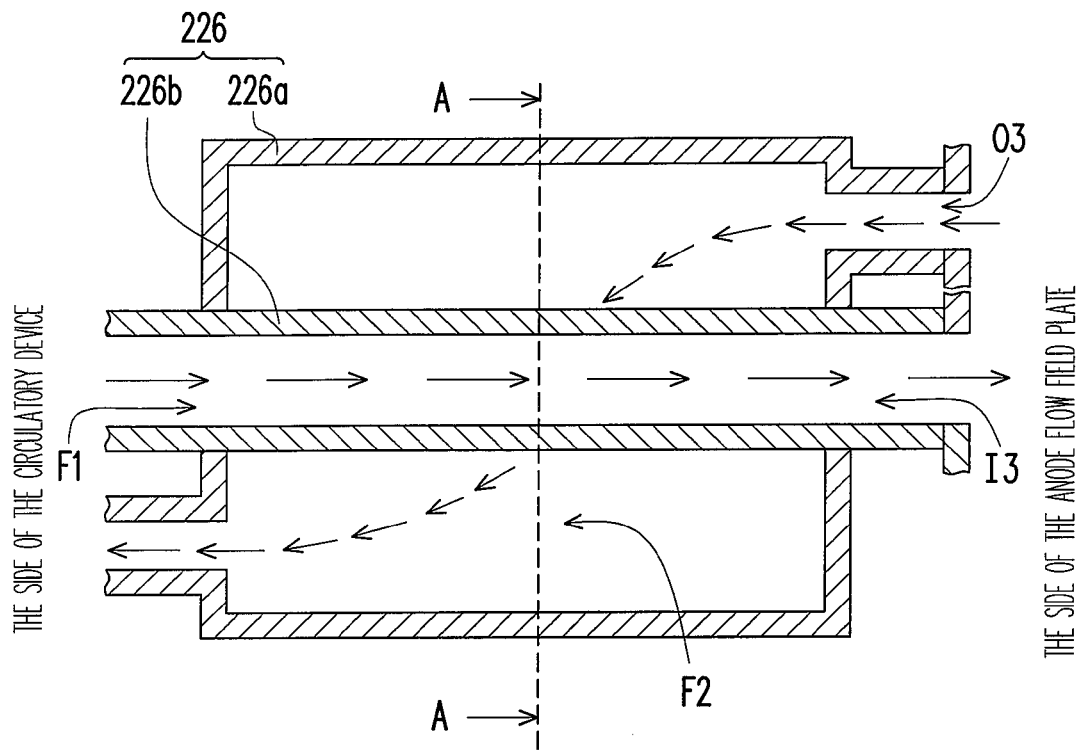
FIG. 2B is a detail structure of the heat exchange module in FIG. 2A.
Figure 2C:
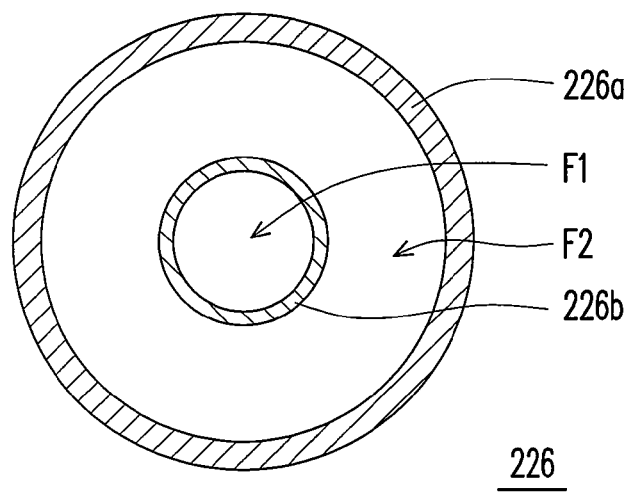
FIG. 2C is a cross-sectional view across A-A sectioning plane of the heat exchange module shown in FIG. 2B.

Referring to FIGS. 2A-2C, a fuel cell system 200 of the present invention includes a circulatory device 210 and a fuel cell module 220. The fuel cell module 220 includes a membrane electrode assembly (MEA) 222, an anode flow field plate 224a, a cathode flow field plate 224b, and a heat exchange module 226. The cathode flow field plate 224b is disposed at a side of the MEA 222. The anode flow field plate 224a is disposed at another side of the MEA 222 and has an inlet I3 and an outlet O3. The heat exchange module 226 includes a fluid-conveying unit 226a and a heat exchange unit 226b. At least a part of the heat exchange unit 226b is disposed inside the fluid-conveying unit 226a to divide the fluid-conveying unit 226a into a first channel F1 and a second channel F2.

In the present embodiment, the MEA 222 includes an anode gas diffusion layer (anode GDL) 222a, an anode catalyst layer 222b, an electrolyte layer 222c, a cathode catalyst layer 222d and a cathode gas diffusion layer (cathode GDL) 222e, which are sequentially arranged. The anode GDL 222a is disposed between the anode flow field plate 224a and the anode catalyst layer 222b. The anode GDL 222a and the cathode GDL 222e are, for example, a carbon cloth or other film layers having diffusion function. The material of the anode catalyst layer 222b and the cathode catalyst layer 222d includes platinum or other types of catalyst, while the electrolyte layer 222c is, for example, a proton exchange membrane (PEM). In addition, the fuel cell module 220 further includes a cathode flow field plate 224b, an anode current-collecting plate 228a and a cathode current-collecting plate 228b. The cathode GDL 222e is located between the cathode catalyst layer 222d and the cathode flow field plate 224b, while the cathode flow field plate 224b is located between the cathode GDL 222e and the anode current-collecting plate 228b. The anode flow field plate 224a is located between the anode current-collecting plate 228a and the anode GDL 222a. However, the present invention does not limit the anode current-collecting plate 228a and the cathode current-collecting plate 228b to be located at the outermost two sides of the fuel cell module 220. In other embodiments, the anode current-collecting plate 228a is located between the anode flow field plate 224a and the anode GDL 222a, and the cathode current-collecting plate 228b is located between the cathode flow field plate 224b and the cathode GDL 222e.

Figure 3:
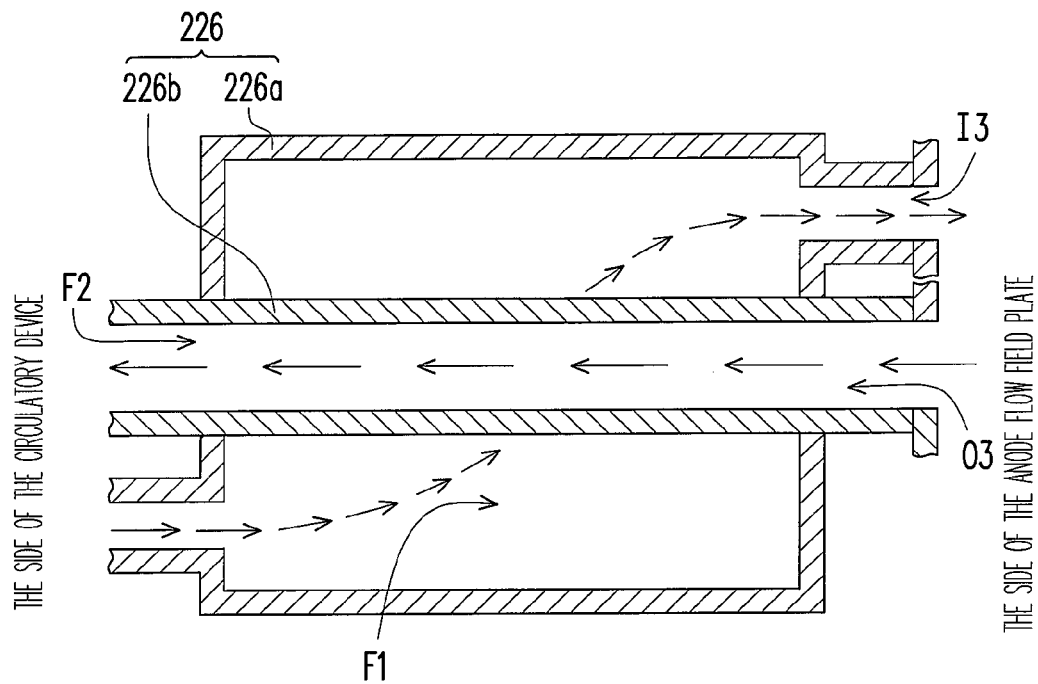
FIG. 3 is a diagram illustrating the layout of a first channel and a second channel according to another embodiment of the present invention.

In the embodiment, the heat exchange unit 226b is a tubular heat exchanger passing through the fluid-conveying unit 226a. The coefficient of thermal conductivity of the heat exchange unit 226b is greater than the coefficient of thermal conductivity of the fluid-conveying unit 226a, and the material of the heat exchange unit 226b is a material with high conductivity coefficient and corrosion resistance, for example, copper or aluminum. In addition, the first channel F1 and the second channel F2 of the embodiment are respectively located at the inner side and the outer side of the heat exchange unit 226b, wherein the first channel F1 communicates with the circulatory device 210 and the inlet I3, while the second channel F2 communicates with the circulatory device 210 and the outlet O3. In another embodiment however, as shown by FIG. 3, the first channel F1 communicating with the inlet I3 and the second channel F2 communicating with the outlet O3 are respectively located at the outer side and the inner side of the heat exchange unit 226b. Referring to FIGS. 2A-2C, the circulatory device 210 in the present embodiment is adapted for injecting a portion of a liquid reactant into the anode flow field plate 224a from the inlet I3 via the first channel F1, while the remainder liquid reactant in the anode flow field plate 224a flows into the circulatory device 210 from the outlet O3 via the second channel F2.

The fuel cell system 200 may further include a fuel-supplying device 230 and the circulatory device 210 may comprise a liquid-mixing unit 212. The liquid-mixing unit 212 is employed for collecting the remainder liquid reactant from the second channel F2 and the liquid reaction product from the cathode flow field plate 224b. The fuel-supplying device 230 is adapted for inputting fuel into the liquid-mixing unit 212 to mix with the remainder liquid reactant and the liquid reaction product into the liquid reactant. The liquid reactant mixed by the fuel, the remainder liquid reactant and the liquid reaction product are injected into the first channel F1 by using a pump 214 so as to make the liquid reactant flow into the anode flow field plate 224a.

In the embodiment, the liquid-mixing unit 212 may include a collecting tank of liquid reaction product 212a, a recycling tank of remainder liquid reactant 212b and a solution-mixing tank 212c. The collecting tank of liquid reaction product 212a communicates with the cathode flow field plate 224b, the recycling tank of remainder liquid reactant 212b communicates with the collecting tank of liquid reaction product 212a and the second channel F2, and the solution-mixing tank 212c communicates with the recycling tank of remainder liquid reactant 212b, the fuel-supplying device 230 and the first channel F1.

The collecting tank of liquid reaction product 212a is employed for collecting the liquid reaction product from the cathode flow field plate 224b. After that, the liquid reaction product is introduced into the recycling tank of remainder liquid reactant 212b so as to mix with the remainder liquid reactant from the second channel F2. Next, the liquid reaction product and the remainder liquid reactant together flow into the solution-mixing tank 212c so as to mix with the fuel from the fuel-supplying device 230 into the liquid reactant with a predetermined concentration. Further, the pump 214 moves the mixed liquid reactant into the first channel F1.

The liquid reactant for initiating an electrochemical reaction in the present embodiment comprises a methanol solution or other fuel solutions. In the following, the methanol solution is exemplarily used to explain the spirit of the present invention. In the embodiment, the gas reactant input into the cathode flow field plate 224b to participate in the cathode half-reaction includes oxygen gas, the liquid reaction product includes water and the fuel comprises pure methanol.

Since the anode half-reaction is able to generate heat, the temperature of the remainder liquid reactant must be higher than the temperature of the liquid reactant, and the temperature of the remainder liquid reactant is utilized to increase the temperature of the liquid reactant, which is explained hereinafter in detail.

When the remainder liquid reactant flows from the outlet O3 to the second channel F2, because the remainder liquid reactant is at a higher temperature, the heat of the remainder liquid reactant is exchanged with the lower temperature liquid reactant in the first channel F1 and thereby increases the temperature of the liquid reactant. In addition, since the remainder liquid reactant while flowing through the second channel F2 gradually exchanges the heat with the liquid reactant located in the first channel F1, and therefore the temperature of the remainder liquid reactant in the second channel F2 gradually decreases from a side proximate to the anode flow field plate 224a to a side proximate to the circulatory device 210, while the temperature of the liquid reactant in the first channel F1 gradually increases from the side proximate to the circulatory device 210 to the side proximate to the anode flow field plate 224a. In this manner, the temperature of the liquid reactant in the anode flow field plate 224a injected from the inlet I3 is increased, and the output of electrical power of the fuel cell system 200 is accordingly increased.

In addition, since the present embodiment employs the heat exchange module 226 to increase the temperature of the liquid reactant injected into the anode flow field plate 224a, no extra electrical energy, like the energy consumed by an electric heating wire or an electric heater in the prior art, is consumed, therefore, the output of electrical power of the fuel cell system 200 of the present embodiment is effectively increased.

Figure 4:
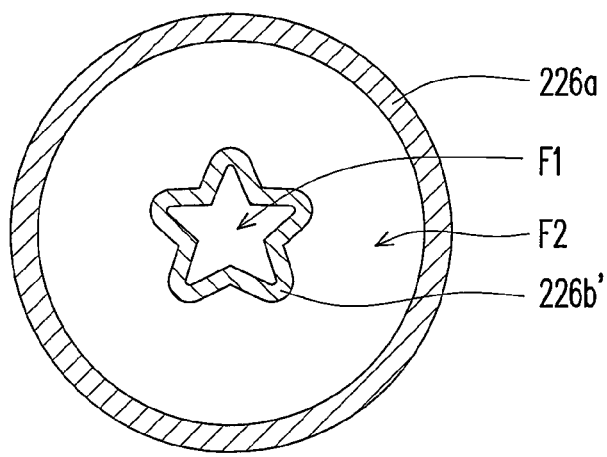
FIG. 4 is a diagram illustrating a variation design of the heat exchange unit in FIG. 2C.

In order to increase the heat exchange rate between the remainder liquid reactant and the liquid reactant, the heat exchange unit 226b' (as shown by FIG. 4) is a tubular heat exchanger with at least a wrinkle on the pipe wall thereof so as to increase the contact surface areas between the heat exchange unit 226b' and the remainder liquid reactant/the liquid reactant.

Figure 5A:
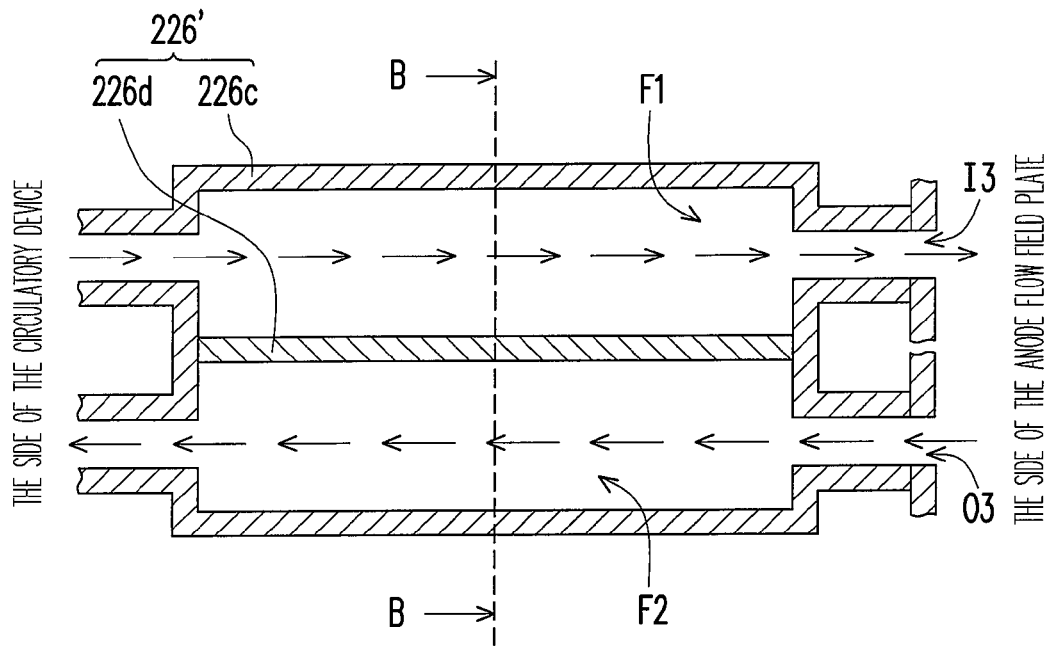
FIG. 5A is a schematic diagram of a heat exchange module of a fuel cell system according to yet another embodiment of the present invention.
Figure 5B:
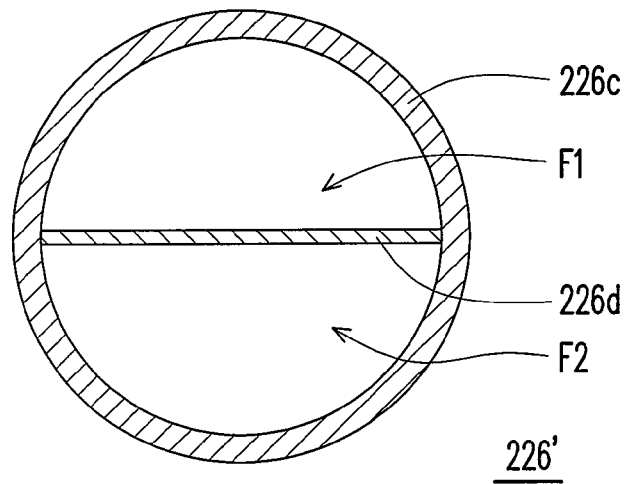
FIG. 5B is a cross-sectional view across B-B sectioning plane of the heat exchange module in FIG. 5A.
Figure 6:
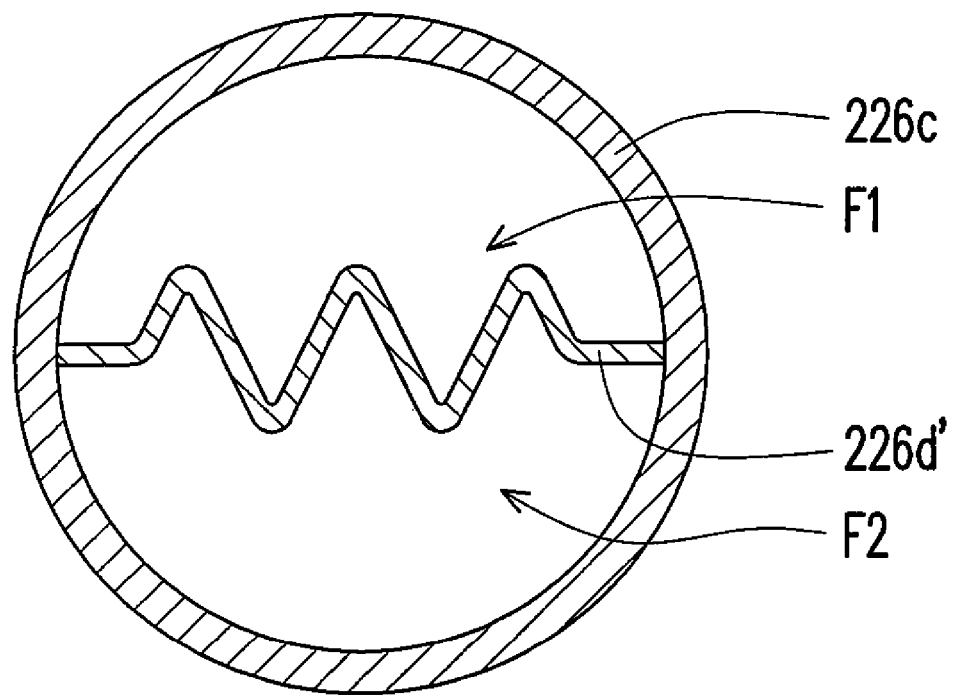
FIG. 6 is a diagram illustrating a variation design of the heat exchange unit in FIG. 5B.

Referring to FIGS. 5A and 5B, the fuel cell system of the present embodiment is similar to the fuel cell system 200 in the above-mentioned embodiment (referring to FIG. 2A) except for the heat exchange module thereof. In the present embodiment, the heat exchange unit 226d of the heat exchange module 226' includes a plate heat exchanger disposed inside the fluid-conveying unit 226c. The first channel F1 is located at a side of the heat exchange unit 226d, while the second channel F2 is located at another side of the heat exchange unit 226d. Besides, the heat exchange unit 226d' (as shown by FIG. 6) is a plate heat exchanger with at least a wrinkle to increase the contact surface area and thereby the heat exchange rate between the remainder liquid reactant and the liquid reactant is increased.

Figure 7:
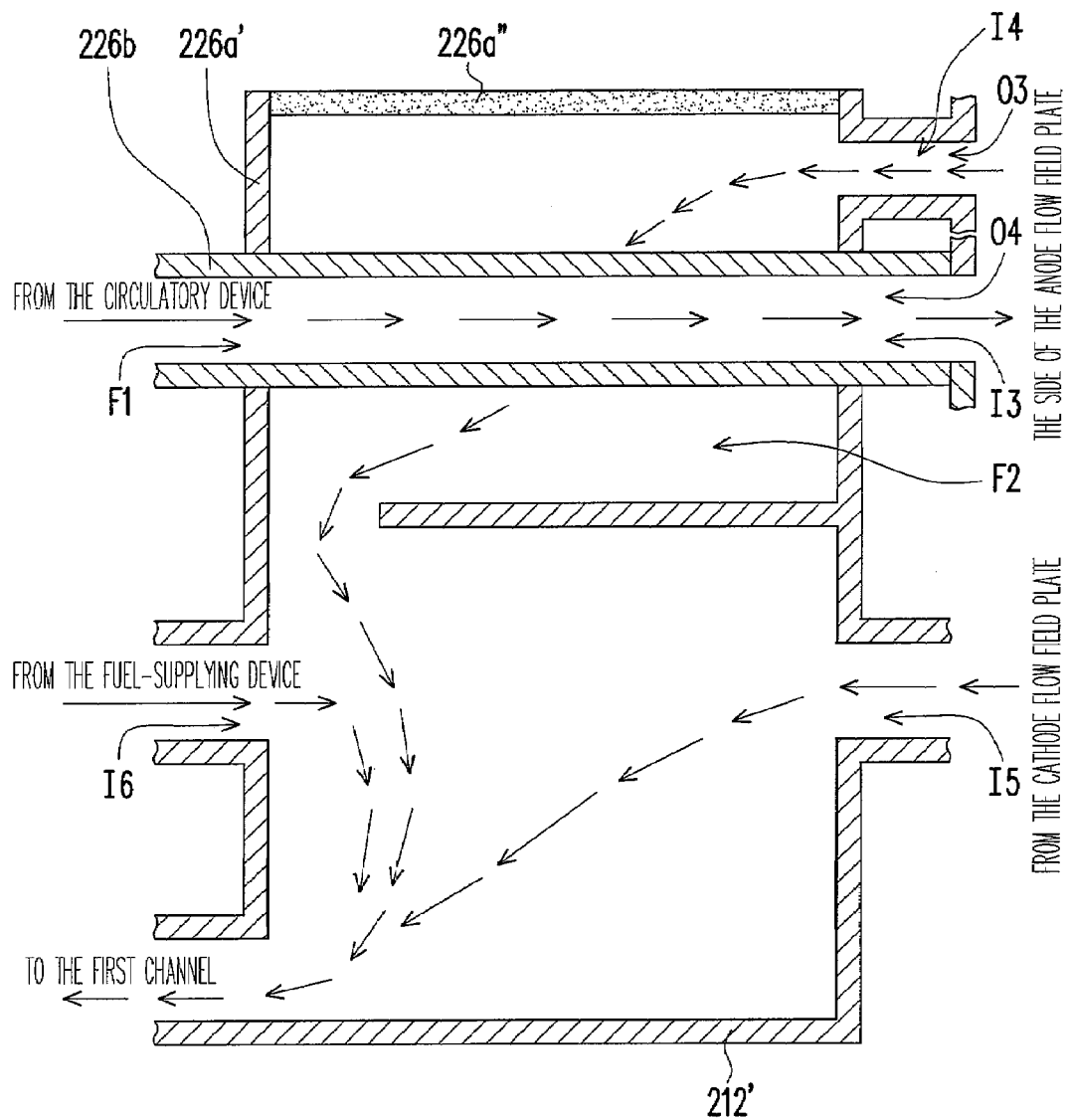
FIG. 7 is a diagram illustrating a liquid-mixing unit and a fluid-conveying unit are integrated into one body.

Referring to FIGS. 2A and 2B, the liquid-mixing unit 212 and the fluid-conveying unit 226a of the heat exchange module 226 in the above-mentioned embodiment are connected by pipelines. In yet another embodiment of the present invention however, as shown in FIG. 7, the liquid-mixing unit 212' and the fluid-conveying unit 226a' are integrated into a liquid-mixing tank as one body. The liquid-mixing tank is adapted for collecting the remainder liquid reactant and a liquid reaction product. The liquid-mixing tank has a first inlet I4, a second inlet I5, a third inlet I6 and a first outlet O4. The first inlet I4 is connected to the outlet O3 to collect the remainder liquid reactant in the anode flow field plate 224a, the second inlet I5 is employed for collecting the liquid reaction product from the cathode flow field plate 224b, the third inlet I6 is employed for collecting the fuel input from the fuel-supplying device 230 and the first outlet O4 communicates with the first channel F1. In addition, after the anode half-reaction, a gas reaction product is produced. For example, when the liquid reactant is methanol solution, the gas reaction product is carbon dioxide ($CO_2$). The gas reaction product is together with the remainder liquid reactant flowed into the second channel F2 via the outlet O3. Due to the poor thermal conductivity of any gas, the gas reaction product counterworks the course where the remainder liquid reactant exchanges heat with the liquid reactant through the heat exchange unit 226b. The top portion of the fluid-conveying unit 226a' in the present embodiment is a gas-permeable but liquid-tight membrane 226a" so as to allow the gas reaction product to be expelled from the fluid-conveying unit 226a'.

In summary, since the fuel cell system of the present invention employs the heat exchange module to make the remainder liquid reactant, which possesses a higher temperature and is output from the outlet, exchange the heat thereof with the liquid reactant, which is at a comparatively lower temperature, through the heat exchange unit, thus, the temperature of the liquid reactant after flowing through the heat exchange module is accordingly increased. Furthermore, the liquid reactant injected into the anode flow field plate from the heat exchange module via the inlet has a higher temperature and accordingly enhance the output of the electrical power of the fuel cell system of the present invention. In addition, since the temperature of the liquid reactant injected into the anode flow field plate is increased by means of a heat exchange module, and therefore no additional electrical energy is being consumed. Thus, the output of the electrical power of the fuel cell system of the present invention is effectively increased.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell system, comprising:
    a circulatory device; and
    a fuel cell module, comprising:
        a membrane electrode assembly;
        an anode flow field plate, disposed at a side of the membrane electrode assembly and having an inlet and an outlet; and
        a heat exchange module, comprising:
            a fluid-conveying unit; and
            a heat exchange unit, wherein at least a part of the heat exchange unit is disposed inside the fluid-conveying unit to divide the fluid-conveying unit into a first channel and a second channel, the first channel communicates with the circulatory device and the inlet, the second channel communicates with the circulatory device and the outlet, the circulatory device is adapted for injecting a portion of a liquid reactant into the anode flow field plate from the inlet via the first channel and a remainder liquid reactant is discharged to the circulatory device from the outlet via the second channel.

2. The fuel cell system according to claim 1, wherein the heat exchange unit includes a tubular heat exchanger passing through the fluid-conveying unit, the first channel is located at an inner side of the heat exchange unit and the second channel is located at an outer side of the heat exchange unit.

3. The fuel cell system according to claim 2, wherein a pipe wall of the tubular heat exchanger has at least a wrinkle.

4. The fuel cell system according to claim 1, wherein the heat exchange unit includes a tubular heat exchanger passing through the fluid-conveying unit, the second channel is located at an inner side of the heat exchange unit and the first channel is located at an outer side of the heat exchange unit.

5. The fuel cell system according to claim 4, wherein a pipe wall of the tubular heat exchanger has at least a wrinkle.

6. The fuel cell system according to claim 1, further comprising a fuel-supplying device, wherein the circulatory device has a liquid-mixing unit for collecting the remainder liquid reactant and a liquid reaction product, and the fuel-supplying device is adapted for inputting fuel into the liquid-mixing unit to mix with the remainder liquid reactant and the liquid reaction product into the liquid reactant.

7. The fuel cell system according to claim 1, wherein the heat exchange unit includes a plate heat exchanger disposed inside the fluid-conveying unit, the first channel is located at a side of the plate heat exchanger and the second channel is located at another side of the plate heat exchanger.

8. The fuel cell system according to claim 7, wherein the plate heat exchanger has at least a wrinkle.

9. The fuel cell system according to claim 1, further comprising a fuel-supplying device and a liquid-mixing unit, wherein the liquid-mixing unit and the fluid-conveying unit are integrally formed with a liquid-mixing tank, the liquid-mixing tank is adapted for collecting the remainder liquid reactant and a liquid reaction product, and the fuel-supplying device is adapted for inputting fuel into the liquid-mixing tank to mix with the remainder liquid reactant and the liquid reaction product into the liquid reactant.

10. The fuel cell system according to claim 9, wherein the liquid-mixing tank comprises a first inlet, a second inlet, a third inlet and a first outlet, the first inlet is connected to the outlet of the anode flow field plate for collecting the remainder liquid reactant, the second inlet is adapted for collecting the liquid reaction product, the third inlet is adapted for collecting the fuel and the first outlet communicates with the first channel.

11. The fuel cell system according to claim 1, wherein a top portion of the fluid-conveying unit is a gas-permeable but liquid-tight membrane.

12. The fuel cell system according to claim 1, wherein a coefficient of thermal conductivity of the heat exchange unit is greater than a coefficient of thermal conductivity of the fluid-conveying unit.

\* \* \* \* \*